United States Patent [19]
Komori et al.

[11] 3,907,424
[45] Sept. 23, 1975

[54] COPYING APPARATUS

[75] Inventors: Shigehiro Komori, Yokohama; Hajime Katayama, Tokyo, both of Japan

[73] Assignee: Canon Kabushiki Kaisha, Tokyo, Japan

[22] Filed: Sept. 26, 1973

[21] Appl. No.: 401,032

[30] Foreign Application Priority Data
Sept. 29, 1972 Japan............................ 47-97151

[52] U.S. Cl............. 355/29; 235/91 PR; 235/98 B; 235/132 E; 355/51
[51] Int. Cl.²... G03B 29/00; G06M 1/00; B61L 1/16; G06M 7/00
[58] Field of Search............... 355/3, 50, 51, 27–29, 355/8, 14; 235/91 PR, 98 B, 132 E

[56] References Cited
UNITED STATES PATENTS
| | | | |
|---|---|---|---|
| 3,614,220 | 10/1971 | Komori et al. | 355/29 X |
| 3,655,281 | 4/1972 | Warren | 235/98 B X |

*Primary Examiner*—Richard A. Wintercorn
*Attorney, Agent, or Firm*—Fitzpatrick, Cella, Harper & Scinto

[57] ABSTRACT

In a copying apparatus having an original carriage, an optical system for projecting therethrough the image of an original upon a copy medium, means for forming a copy image corresponding to the original image, and copy medium storage means corresponding in size to the original, there are provided two or more copy counters capable of counting the number of copies for each copy size.

13 Claims, 24 Drawing Figures

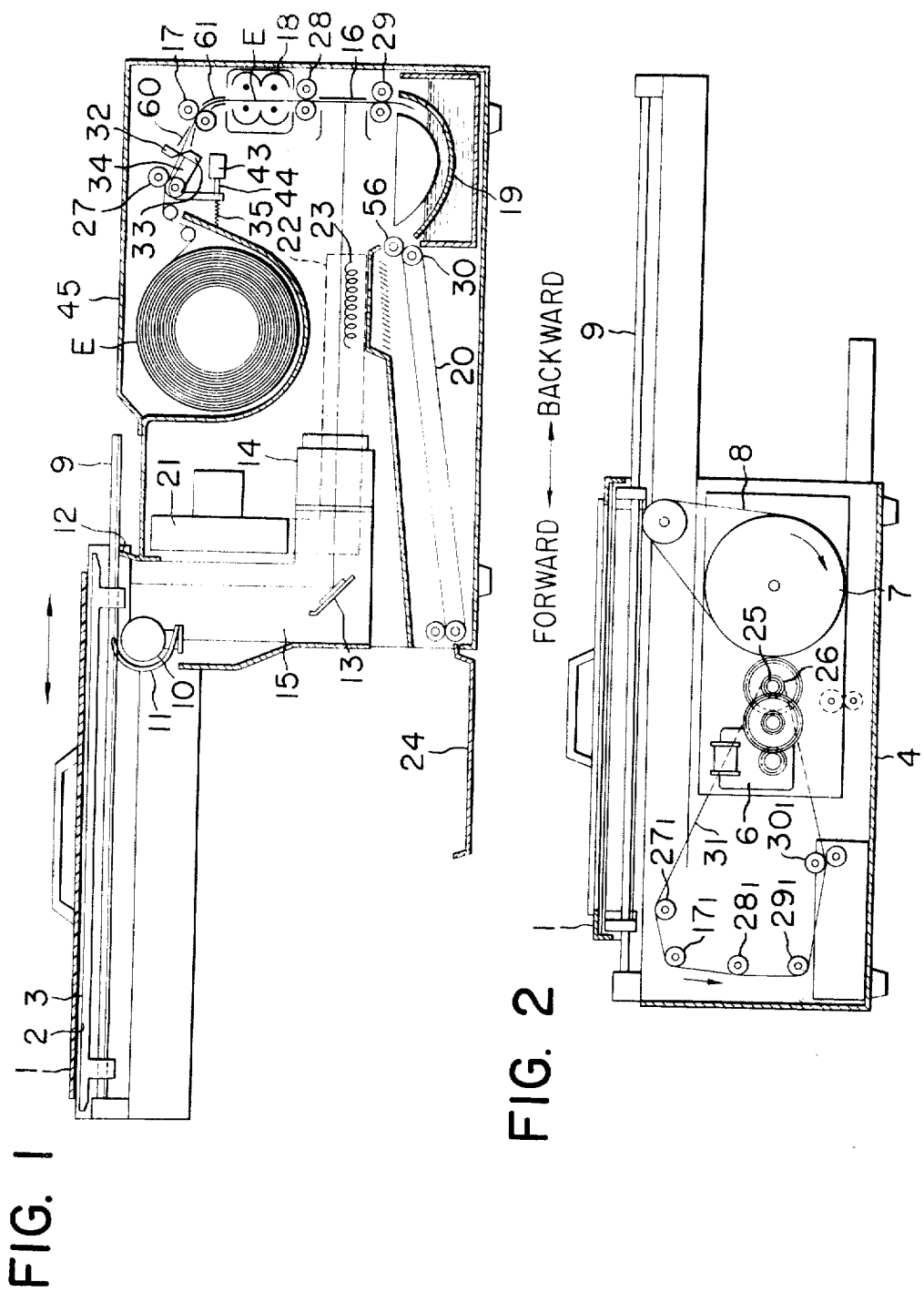

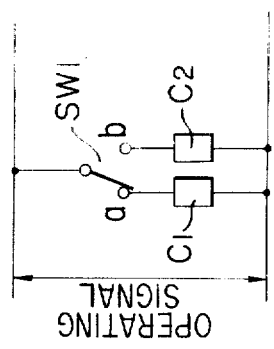
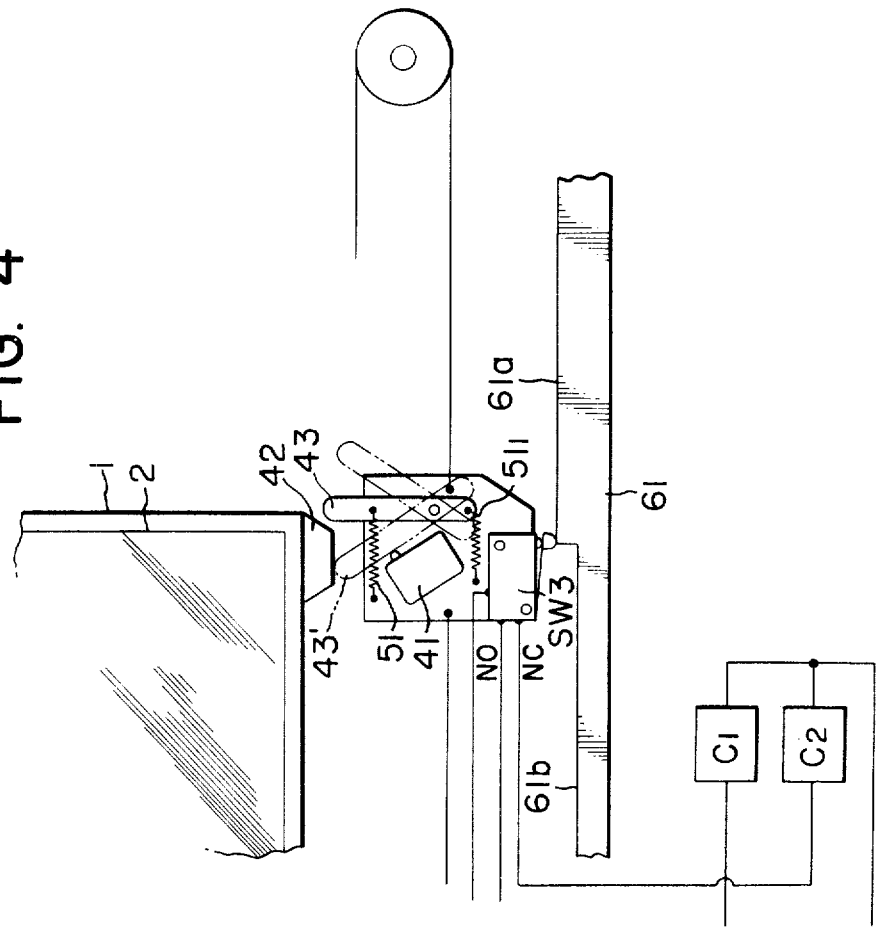

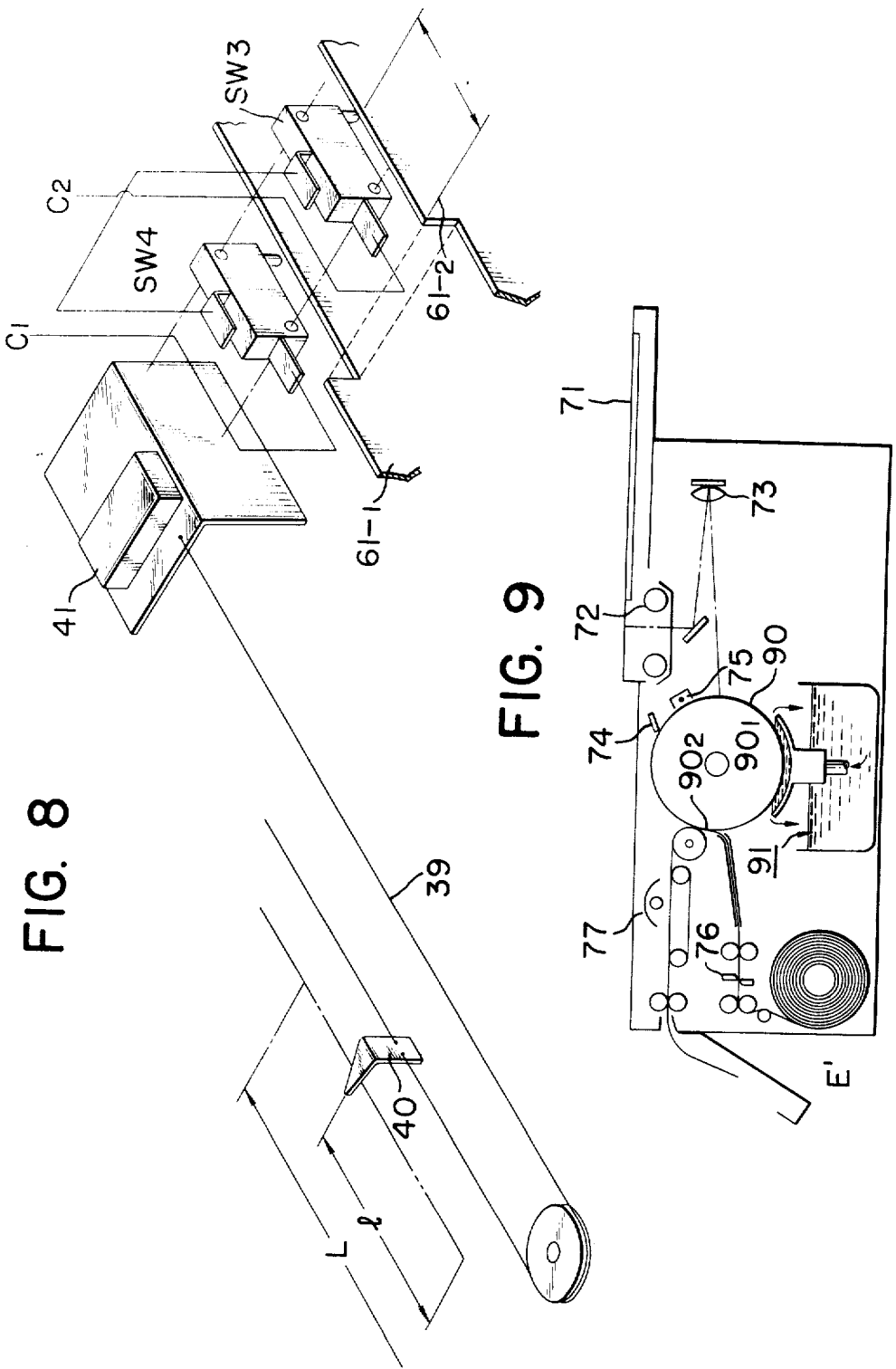

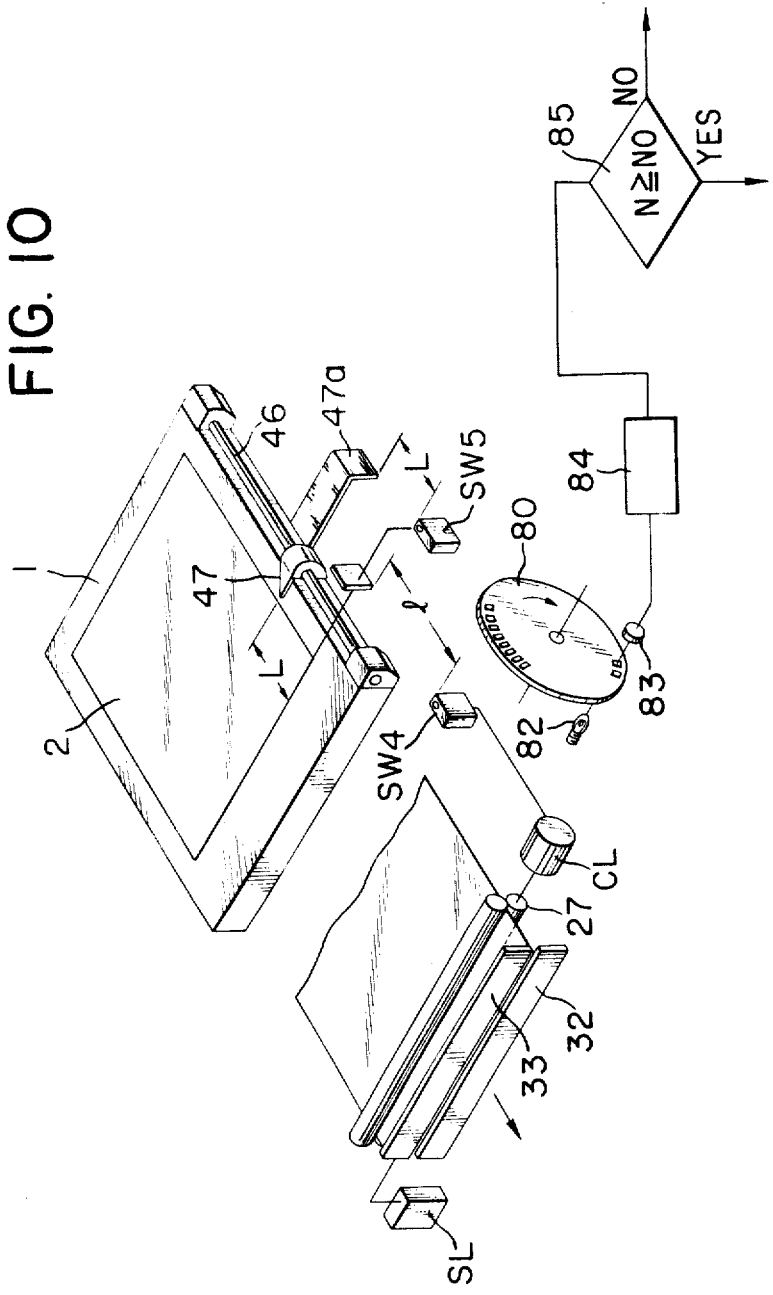

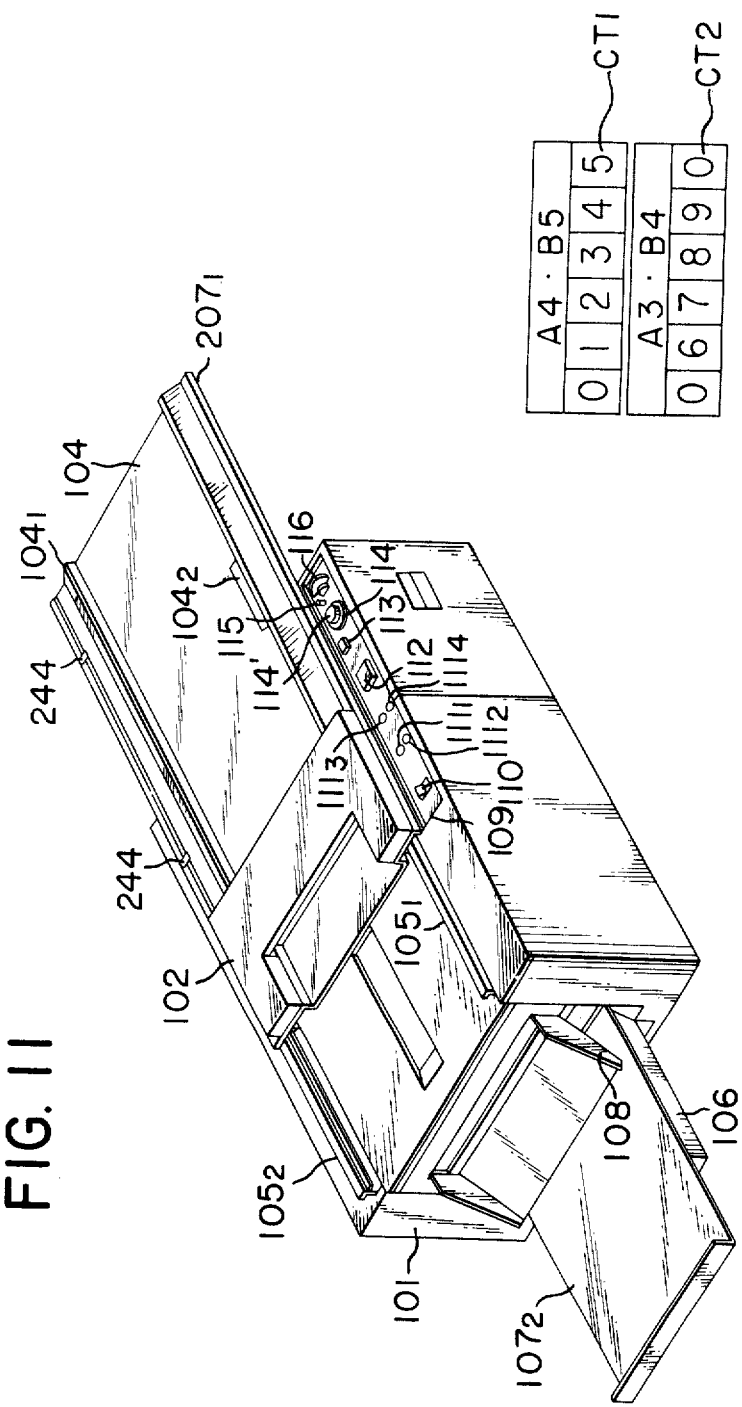

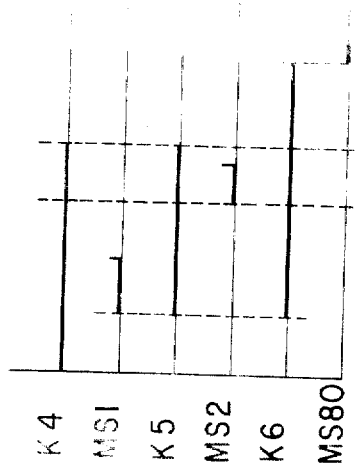
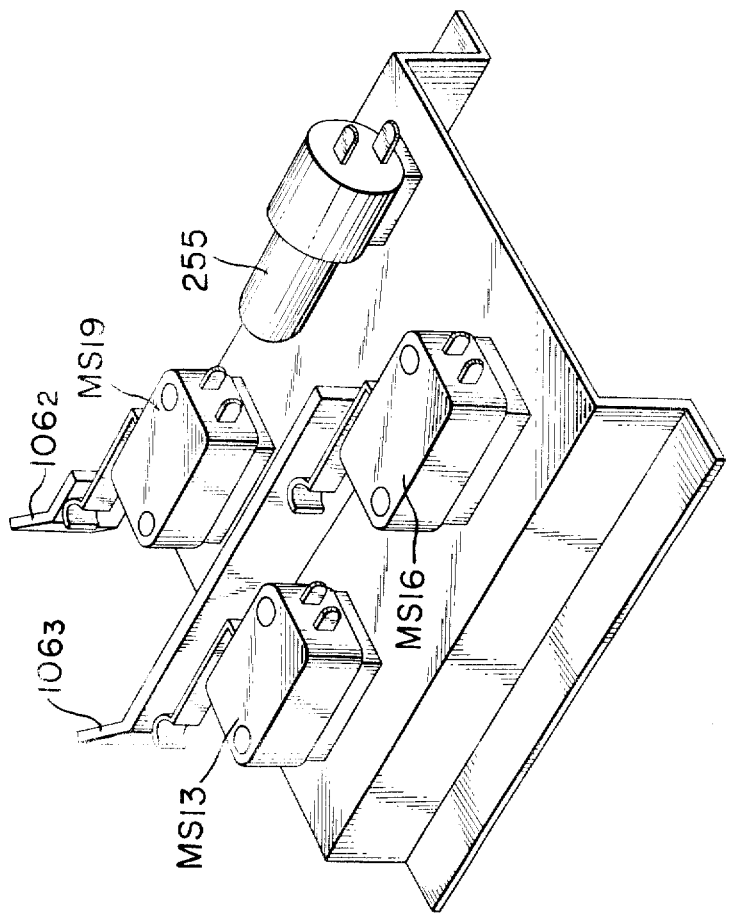

COPYING APPARATUS

BACKGROUND OF THE INVENTION

1. Field of the Invention

This invention relates to a copying apparatus having copy counter means, and more particularly to a copying apparatus adapted for the rental system or the total guarantee system whereby billing is determined in proportion to the number of copies produced.

2. Description of the Prior Art

One way of marketing copying machines is the so-called rental system which leases the machines to users and charges an amount in proportion to the number of copies produced by the leased machines.

In another marketing system, which has further developed from the rental system, copying machines are sold at certain reasonable prices and the costs of expendables and maintenance services are collected in proportion to the number of copies produced.

In either of these systems, each copier must be provided with counter means for counting the number of copies and it has heretofore been the practice to employ a common counter for various sizes of copies and determine the charge per copy regardless of the different copy sizes. According to such a system, the amount charged for copies could not rationally correspond to the copy sizes and the losses of the machines and expendables.

SUMMARY OF THE INVENTION

It is an object of the present invention to provide a copying apparatus which uses a roll of photosensitive or transfer paper and in which the billing system comprises a plurality of rates determined in accordance with various lengths of paper fed from said roll and counters are provided for counting the number of copies in accordance with the length of paper for each billing, whereby billing control is effected in proportion to the length of the photosensitive or transfer paper used.

It is another object of the present invention to provide a copying apparatus in which counters are provided in accordance with the various sizes such as formats A4 and B4 of the photosensitive or transfer paper to thereby achieve a rational charge rationally (i.e. in proportion to the consumption of such paper). (Note: A4 and B4, as well as A3 and B5, indicate sizes of sheet material according to Japanese Industrial Standards, which are, respectively, about 21 × 30 cm., 26 × 36 cm., 30 × 42 cm. and 26 × 18 cm.)

According to the present invention, the use of rolled photosensitive or transfer paper firstly makes the transport mechanism for such paper simpler and more accurate than the use of pre-cut sheets, and secondly leads to the saving of the paper material as well as to the compact size of the apparatus. Further, the present invention is applicable not only to the so-called step cutting system whereby a roll of photosensitive or transfer paper may be cut into various predetermined lengths of sheets, but also to the so-called random cutting system whereby a roll of photosensitive or transfer paper may be cut into any desired length in accordance with the length of an original to thereby eliminate the waste of the paper material.

Although the present invention will herein be described with respect to a counter device in a copying apparatus of the random cutting type, it should be understood that the invention is intended to cover both the step cutting system and the random cutting system.

The invention will become more fully apparent from the following detailed description of various embodiments thereof taken in conjunction with the accompanying drawings.

BRIEF DESCRIPTION OF THE DRAWINGS

FIG. 1 is a front view, in vertical section, of the copying apparatus adapting an embodiment of the present invention.

FIG. 2 is a rear view of such apparatus showing the drive system thereof.

FIG. 4 illustrates the arrangement of copy paper cut signal and counter change-over switches.

FIG. 7 is a diagram of the counter change-over circuit.

FIG. 8 illustrates the principle of a mechanism for grouping cut copy sheets into two grades in accordance with the lengths thereof and for operating the counters in accordance with such grades.

FIG. 9 is a schematic view of a transfer type copier.

FIG. 10 is a perspective view showing a modified form of the mechanism for operating the counters.

FIG. 11 is a pictorial perspective view showing an electrophotographic copying apparatus to which the present invention is applicable.

FIG. 11a is an enlarged detail of the numerical display of the copy counters of FIG. 11.

FIG. 21 is a perspective view illustrating the relationship between a cam on the cassette and microswitches provided on the machine body.

FIG. 23 is a time chart for various switches.

DESCRIPTION OF THE PREFERRED EMBODIMENTS

Figure 3:
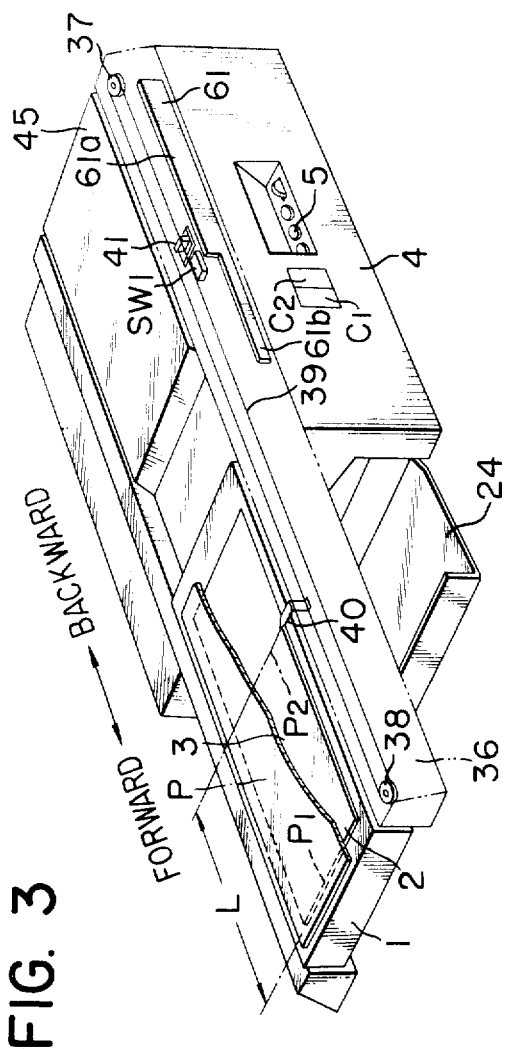
FIG. 3 is a perspective view of the apparatus.

First, an electrophotographic copying apparatus to which the present invention is applicable will be generally described. As shown in FIG. 3, an original sheet of paper P is placed on a glass plate 2 on an original carriage 1 and kept in place by means of a rubber sheet 3. Depression of a start button 5 provided at a suitable point in a machine housing 4 will cause revolution of a motor 6 (FIG. 2), which in turn drives to rotate a pulley 7 in the direction of arrow indicated in FIG. 2 (through a transmission not shown) so that a belt 8 connected to each side of the original carriage 1 moves the carriage forwardly along rails 9 from its left-hand position as shown in FIG. 1 to its right-hand position as shown in FIG. 2.

The end of such forward stroke of the carriage 1 is detected by a microswitch or like means, whereupon the rotation of the pulley is reversed to move the carriage backwardly until it is stopped at its position as shown in FIG. 1 or 3 so as to permit replacement of the original P.

The forward stroke, which corresponds to a preparatory stroke, is utilized to provide for a period of time during which a sheet of photosensitive paper E passes through a charger 18. The backward stroke corresponds to an exposure stroke and the start point of the backward stroke means the exposure start point and is substantially fixed. Actually, the start point of the backward stroke is located somewhat beyond the exposure start point so as to provide for a time allowance required for the original carriage to attain its predetermined velocity for the backward stroke.

In contrast, the terminal point of the backward stroke corresponds to the exposure termination point and thus, it is variable with the length of an original to be copied.

As soon as the above-described backward stroke is entered a lamp 10 (FIG. 1) is turned on to illuminate the original P from therebelow with the aid of reflecting mirror 11 and 12 and the image of the original is passed by way of a reflecting mirror 13 and a lens 14 in a lens tube 15 of L-shaped cross-section and to an exposure station 16, where the original image is focused on a sheet of electrophotographic sensitive paper E moving at the same velocity as the backward movement of the original, thus accomplishing through-the-slit exposure.

Photosensitive paper E is supplied in a web from through a set of feed rollers 27 to pass between a pair of cutters 32 and 33, which cut the web of paper into a sheet. The web of photosensitive paper normally remains stationary with the leading edge thereof positioned at the cutters because the feed rollers 27 are stopped as soon as the cutting has taken place. The feed roller system starts its rotation upon initiation of the forward movement of the original carriage, but the feed rollers 27 start their rotations only in response to a paper feed signal produced by the movement of the original carriage. The sheet of photosensitive paper E is guided along a guide 60 and nipped between a pair of rollers 17, then passed through a guide 61 into a charging station 18, where it is charged and thereafter advanced by transport rollers 28 to a guide portion for exposure station 16. The paper feed signal is set to a predetermined point of time by a switch integrally formed with a cam provided on the original carriage and through the utilization of the movement of the carriage, and such signal determines the point of time for feeding the photosensitive paper so that the original image may be projected upon proper successive portions of the photosensitive paper sheet as it moves through the exposure station 16.

The drive means for the original carriage and the drive means for the paper feed system are associated together in such a manner that the backward or exposure stroke of the original carriage 1 begins when the leading edge of the moving photosensitive sheet begins to enter the effective focused position of the optical image in the exposure station 16.

After the photosensitive paper sheet E has been so subjected to through-the-slit exposure to form an electrostatic latent image thereon, it is passed through a liquid developing device 19 and conveyed by a conveyor 20 onto a copy tray 24. Between the developing device and the copy tray, the photosensitive paper sheet E is exposed to warm air introduced by a fan 21 from the neighborhood of the lamp 10 and blown through a duct 22, which air may be heated by a heater 23 if required, whereby the photosensitive sheet E is dried with the powder image fixed thereon.

In the above-described construction of the copying machine, there is a large space between the L-shaped lens tube 15 and the charger 18. Utilization of such space to accommodate a roll of photosensitive paper E therein and feed it therefrom will ensure a simpler arrangement and higher reliability of operation than a feed mechanism for photosensitive paper stocked in the form of sheets. Further, cutting the web of photosensitive paper into a length corresponding to that of an original P will contribute to the saving of the photosensitive paper material.

This may be achieved by the present invention. In accordance therewith, as shown in FIG. 3, an endless string 39 is trained about pulleys 37 and 38 so as to extend parallel to the path of the original carriage 1, and has attached thereto an index member 40 manually settable to one end edge P2 of the original P and a microswitch 41 movable in the direction opposite to the index member. Proportions are selected such that when the original P is placed with the other end edge P1 thereof registered with a reference position on the carriage 1, e.g. the rear end of the glass plate 2, and with the one end P2 registered with the index member 40, and then the original carriage is brought to its exposure stroke start position, FIG. 2, (which agrees with the forward stroke terminating position or the backward stroke start position), the distance between a cam 42 (FIG. 4) provided on the carriage 1 and the microswitch 41 is equal to the length L of the original P minus the distance between the cutters 32, 33 and the entrance to the exposure station 16.

Also, when the original carriage 1 has moved backwardly from the forward stroke terminating position of FIG. 2 to cause the cam 42 to actuate the lever 43 in the manner as indicated by dot-and-dash line in FIG. 4 to thereby close the microswitch 41, a signal is thereby produced to operate the electrical control circuit to close the movable cutter 33 with respect to the fixed cutter 32, thereby cutting the web of photosensitive paper E while, at the same time, disconnecting the feed rollers 27 from their prime mover through a clutch to thereby stop further feed of the photosensitive paper from the supply roll.

Thus, at a predetermined point of time during the forward stroke of the original carriage 1, a paper feed signal is produced to feed the cut sheet of photosensitive paper E from the cutters 32, 33 and, when the leading edge of such sheet has arrived at a point just short of the entrance to the exposure station, the original carriage 1 reverts to its backward stroke to initiate the exposure stroke; when the cam 42 has actuated to close the microswitch 41, the cutters 32, 33 cut the web of photosensitive paper E again into a length of sheet equal to the length of the original. In this way, there is repeated a random length cutting cycle.

Thereafter, with the backward movement of the carriage 1, the sheet of photosensitive paper E is transported by transport rollers 17, 28, 29–30 at the same velocity as the original P so as to pass through the exposure station 16 and the liquid developing device 19 onto the conveyor 20, which in turn discharges the photosensitive sheet E through the warm-air drying-fixing station onto the tray 24.

Figure 6:
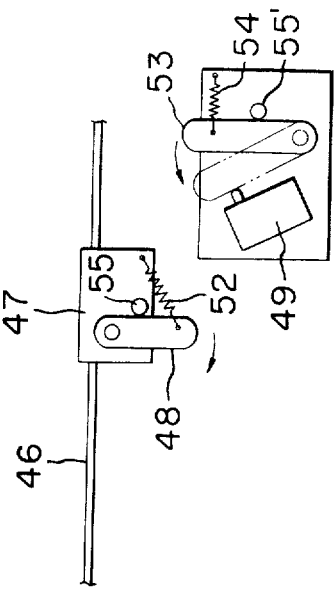
FIG. 6 is a front view of such mechanism.
Figure 5:
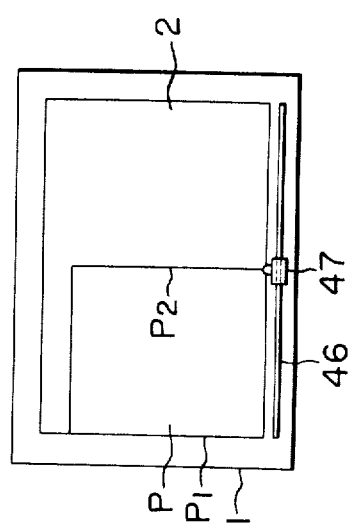
FIG. 5 is a plan view showing another embodiment of the copy paper cut signal switch mechanism.

FIGS. 5 and 6 illustrate an embodiment of the present invention which is similar in concept to the previous embodiment but different in construction from the latter. A guide rob groove 46 is provided in the original carriage 1 and carries thereon a manually movable index member 47 which may be registered with one end edge P2 of an original P. The index member 47 is provided with a pivotable actuator 48. The design is made such that the distance traversed by the actuator 48 from the point of time at which the actuator reverts to its backward stroke from the end of its forward stroke to initiate an exposure stroke till the point of time at which the actuator closes a microswitch 49 secured to the machine housing 4 is equal to the length L of the original minus the distance between the cutter device 32, 33 and the entrance to the exposure station 16, as in the previous embodiment.

It should be noted that the actuator 48 and the cam 42 in FIG. 4 are such that they do not act on microswitches 41 and 49 during the forward stroke but only during the backward stroke. For this purpose, in the FIG. 4 embodiment, the lever 43 normally biased into its neutral position by springs 51 and $51_1$ is adapted to be urged away from the microswitch 41 by the cam 42 during the forward stroke and to be urged toward the micreswitch 41 by said cam to close the microswitch during the backward stroke. In the embodiment of FIG. 6, the actuator 48 is adapted to pivot clockwisely against the force of its spring 55 during the forward stroke and to urge a lever 53 toward the microswitch 49 against the force of a return spring 54 to close the switch 49 during the backward stroke.

Although the drive mechanism for the photosensitive paper transport rollers 27, 17, 28–30 may be any suitable one, the shown embodiments employ a construction comprising transmission wheels $27_1$, $17_1$, $28_1$–$30_1$ mounted coaxially with those respective rollers and a belt or chain 31 connecting these transmission wheels to a transmission wheel 26 driven from motor 6. A clutch (not shown) is provided between the transmission wheel $27_1$ or the shaft thereof and the transport roller 27 and may be engaged in response to a paper feed signal and disengaged in response to a signal from either the microswitch 41 or the microswitch 49.

Also, in response to the latter signal, the electrical control circuit is operable so that a plunger 44 is actuated mechanically or by the action of electromagnetic coil 43 (FIG. 1) to attract the lever 34 against the force of spring 35, whereby the movable cutter 33 secured to the lever 34 is closed with respect to the fixed cutter 32 to thereby cut the web of photosensitive paper E.

The above-described embodiments are of the so-called direct imaging type in which the image of an original is directly projected upon the surface of photosensitive paper and movement of the original carriage provides the basis for controlling the paper feed in that a signal from the carriage is utilized to effect such control.

The concept of the present invention is applicable not only to the above-described type of copiers but also to other copiers which include a reciprocable original carriage and utilize a paper cut signal occurring during the exposure stroke of the carriage. These latter copiers will be generally described hereinafter.

1. Direct Imaging Type

The stop position for the original carriage is selected to a point just short of the exposure stroke start point so that paper feed can start in advance and a signal from the paper feed system controls the movement of the carriage.

More specifically, when a sheet of photosensitive paper fed reaches a point just short of the entrance to the exposure station, the original carriage is started to initiate an exposure stroke. Therefore, a group of paper switches is provided in the path of photosensitive paper and may be actuated by the leading or trailing edge of a photosensitive sheet so as to provide a signal with the paper feed system as the control reference.

2. Image Transfer Type

In this type of copiers whose principle is as shown in FIG. 9, the image of an original is first projected upon the surface of a photosensitive drum such as 90 to form an electrostatic latent image thereon, and then such latent image is developed into a visible image which in turn is transferred to transfer paper E.

In FIG. 9, there is seen an original carriage 71, illuminating lamp means 72, an optical system 73, a blade cleaner 74, a charger 75, cutter means 76, and drying-fixing device 77.

Copiers of this type may involve the following two cases: (1) one in which the transfer paper must leave or must have left the cutter means at or before the point of time when the original carriage initiates its exposure stroke; and (2) one which the transfer paper must not leave the cutter means at or before said point of time. These can be met by changing the arrangement and construction of the machine parts. In case of the item (1) above, the distance traversed by the original carriage from its initiation of the exposure stroke till it closes the microswitch secured to the machine housing may be selected to a value equal to the length L of an original minus the distance over which the transfer sheet has travelled from the cutter means. In case of the item (2) above, the aforesaid distance traversed by the original carriage may be selected to a value equal to said length L of the original plus the distance which has already been traversed by the original carriage for the exposure stroke until the point of time when the transfer sheet has left the cutter means.

In the latter case, however, such distance may sometimes be greater than the total amount of the forward and backward movement of the original carriage and, in these cases, any suitable electrical delay circuit may be utilized to produce a signal earlier by the time difference corresponding to the distance difference and the microswitch secured to the machine housing must be located within the range of reciprocating movement of the carriage. In other words, a signal must be produced during movement of the carriage and after a suitable delay is electrically provided, the cutter means must be actuated to effect paper cutting.

In the embodiment now under discussion, the copying apparatus having a random cutting device of the above-described type is provided with two counters C1 and C2 (for changing over the billing system between two rates, for example) located at any suitable points in the apparatus body, as shown in FIGS. 3 and 7, and a switch SWI movable with the microswitch 41 and a cam 61 for changing over the switch SW1 are further provided in the apparatus body. In this instance, the cam 61 is formed into two steps 61a and 61b and the wiring is designed, as shown in FIG. 7, so that a counter operating signal goes to the counter C1 when the switch SW1 is on the cam portion 61a and goes to the counter C2 when the switch SW1 is on the cam portion 61b.

The counter operating signal may be a predetermined pulse provided from a sheet of paper fed, or from the original carriage in motion, or from any suitable device such as sheet number selector or the like.

The lengths of the cam portions 61a and 61b are variable with the billing system. For example, if divided into these two cam portions in accordance with the length L of the original paper, the cam 61 is so set that the microswitch 41 for providing an instruction for random cutting operation is actuated by the aforesaid cam 42 on the original carriage while, at the same time, the switch SW1 shifts from the cam portion 61a to the cam portion 61b.

FIG. 8 illustrates the principle underlying the present embodiment.

If the billing system is divided into two rates with the length L of the original paper as the boundary, microswitches SW4 and SW3 are operatively connected to the index member 40 which is settable to the size of the original and cam 61-1 and 61-2 are respectively provided for microswitches SW4 and SW3, these cams being so set that the cam 61-2 is disengaged from the associated switch SW3 but the cam 61-1 is engaged with the associated switch SW4 when the carriage comes to the position corresponding to the length L of the original. Also, counters C1 and C2 are connected with microswitches SW4 and SW3, respectively, so that the operating signal for these counters may be provided from microswitch 41 for producing a random length cutting instruction.

It is already apparent that for a size of original smaller than L, the number of resulting copies is recorded only in the counter C2 and for a size of original equal to or larger than L, the number resulting copies is recorded in the counter C1.

FIG. 10 shows an embodiment in which a signal is produced in the case mentioned under item 2) above, i.e. during movement of the original carriage, and after a suitable delay is electrically provided, the cutter means is operated.

If this embodiment employs a random cutting system of the type in which paper feed occurs in response to an instruction from a paper feed signal producing microswitch SW4 located at an intermediate point in the path of the original carriage (which point is determined by the difference $l$ between the distance from exposure position $90_1$ to transfer position $90_2$ on drum 90 and the distance from the start point 76 for paper to said transfer position $90_2$), an index member 47 is designed for sliding movement along a rail 46 secured to and extending along one end of the original carriage 1 and it is provided with an integrally formed actuator 47a. Detector means SW5 is secured to the apparatus body and engageable with the actuator 47a.

When the size of the original is L=0, for example, the position of the actuator 47a is selected such that it is engaged with switch SW5 in the rest position of the original carriage. As is apparent, when the carriage has advanced by a distance $l$, clutch CL is electrically energized in response to an instruction from switch SW4 to thereby initiate the paper feed; therefore, if solenoid SL is energized to cut the paper web after the carriage has moved by a distance $l$ upon actuation of the switch SW5 (i.e. after $l/v$ sec. where V is the velocity of the carriage which is equal to the velocity of the paper), then there is provided a sheet of paper having a length equal to the length L of the original. In this instance, a disc 80 rotatable with the exposure stroke movement of the carriage is provided with a ring of equally spaced slits 81 each having a very small width, and a light source 82 and a light receiving element 83 are disposed in opposed relationship with the slitted disc 80 so that there is produced a predetermined pitch of pulse corresponding to the distance of travel of the carriage. The pulse number, of course, has a predetermined relationship with the distance of travel of the carriage and therefore, the paper can be cut into a length exactly equal to the length of the original by counting the pulses through a counter 84 during the movement of the carriage, deenergizing the clutch CL but energizing the solenoid SL with a time delay amounting to the number of pulses corresponding to $l/V$ sec. after the actuator 47a has actuated the switch SW5, thereby operating the cutter 32.

By counting the total pulse number, the length of the cut paper sheet and accordingly the length of the original can be known. Therefore, such pulse number N is compared, by a comparator 85, with a reference pulse number NO preset in accordance with the aforesaid billing system, and the result is recorded in a graded manner, i.e. by counter C2 when N ≧ NO and by counter C1 when N<NO. It will be apparent that the delay of $l/V$ sec. may be provided by a conventional timer and that the counters and comparator may be of any conventional type.

In the present embodiment, it will also be apparent that the detector means, cam and counters may be similar to those used in the previous embodiment.

A further embodiment of the present invention will be described which employs pre-cut sheets of photosensitive or transfer medium.

Figure 12:
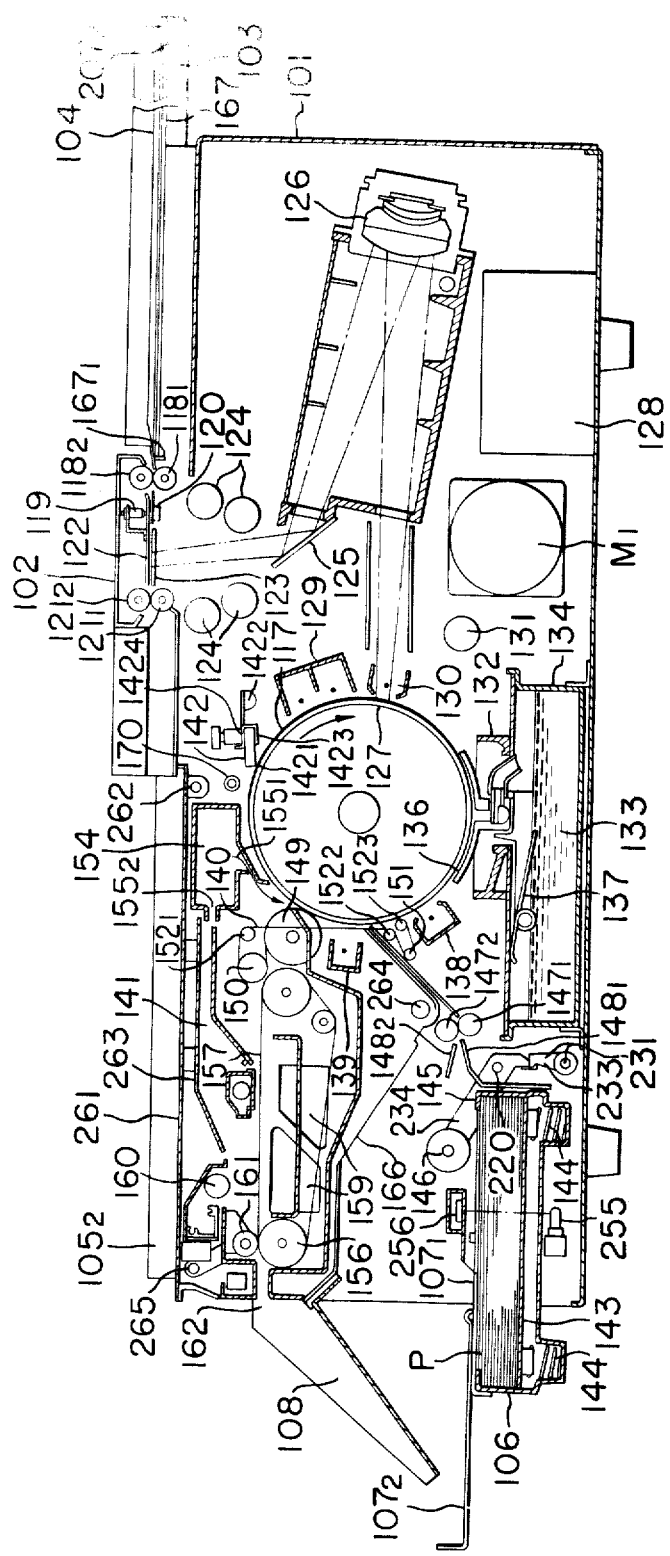
FIG. 12 is a vertical section of the apparatus shown in FIG. 11.

FIGS. 11 and 12 show a drum type electrophotographic copying apparatus according to this embodiment.

When an original is passing over a glass plate 123 in an illuminating station 122, it is illuminated by lamp means 124 so that the image of the original is directed by way of mirror 125 and mirror lens 126 to an exposure station 127 and focused on a photosensitive drum 117. A photosensitive medium covering the surface of the drum comprises a photosensitive layer covered with a transparent insulative layer.

The photosensitive drum 117 is rotated in the direction of the arrow and charged with a positive polarity by a primary charger 129 which is supplied with a high voltage from a high voltage source 128. Subsequently, at an exposure station 127, the surface of the photosensitive drum is exposed to the image of the original through the slit while being AC-discharged by a discharger 130 which is supplied with a high AC voltage/-from the voltage source 128, whereafter the surface of the photosensitive drum is subjected to an over all exposure process by a lamp 131 to form an electrostatic latent image thereon. However, the described sequence of processes may be replaced by a sequence of DC primary charging, simultaneous application of image light and secondary charge of the opposite polarity, and overall exposure. Alternatively, the secondary charging may take place immediately after the application of image light.

The latent image on the surface of the photosensitive drum is developed into a visible image in a developing device 132 by means of developing liquid 133 therein, whereafter the drum surface is corona-charged to squeeze out any excess developer therefrom without disturbing the formed image. A sheet of transfer paper P fed from a paper supply station by a roller 146 or the like is brought into intimate contact with the surface of the photosensitive drum 117 and a positive corona charge is applied to the transfer paper P from a charger 139 to transfer the image from the drum surface to the transfer paper P, whereafter the paper P is separated from the drum surface by a separator belt 140 and guided to a drying-fixing station 141 by a belt 157.

The transfer paper P is heated just below a heater 158 and dried for fixing with the aid of warm air blown toward the heater from a duct 154 through the discharge port $155_2$ thereof, whereafter any residual charge on the surface of the paper P is removed by a discharger 160, and then the transfer paper is finally discharged by a discharge roller 161 through an outlet 162 onto a tray 108 and further onto a tray $107_2$.

In such a drum type image transfer electrophotographic copying machine, the original carriage 103 has a carriage portion 167 (glass plate) for book or like original and a sheet original transport portion 102, both mounted on an angle which is movable by means of rollers along rails $105_1$ and $105_2$ on the machine housing 101. A gear 189 is provided at the forward end of the sheet original transport portion and driven from a drum gear 177 integral or coaxial with the photosensitive drum 117 through the agency of relay gears 209–211. The drive taken by the gear 189 is transmitted to a roller $121_1$ through a combination of synchropulley 190 coaxial with the gear 189, synchro-belt 191 and synchropulley 192, and further transmitted through a synchro-belt 193 to a pulley 194, from which the drive is transmitted to a roller $118_1$ under the control of a clutch CL1.

Figure 14:
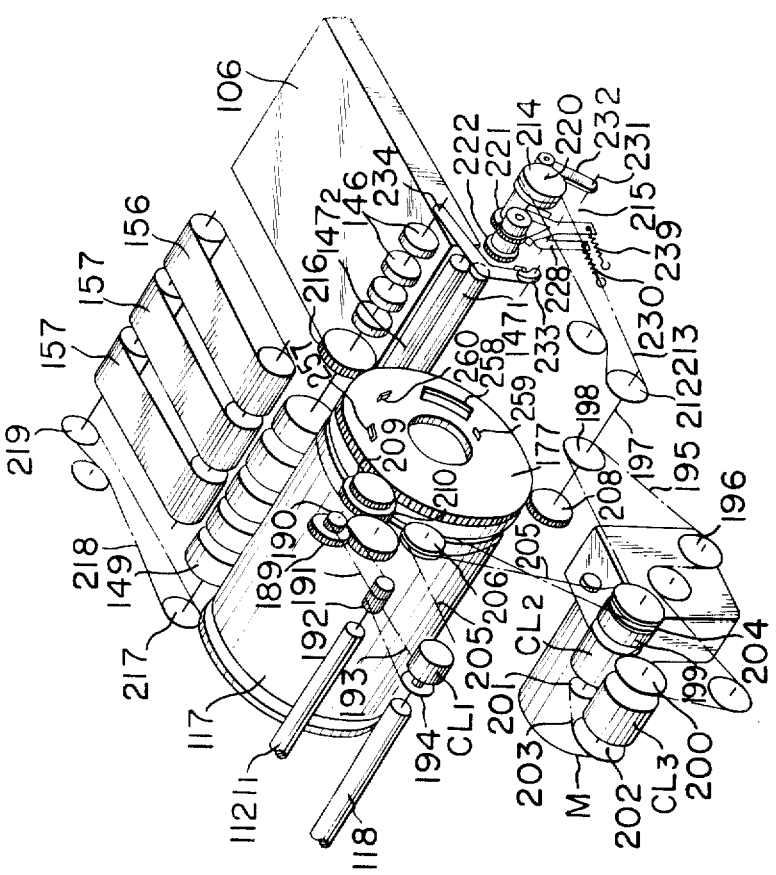
FIG. 14 is a perspective view illustrating the drive system.

In FIG. 14, the drive of main motor M1 is transmitted through sprocket wheel 196, chain 195, sprocket wheel 198, relay shaft 197 and gear 208 to drive the drum gear 177 and the photosensitive drum 117. Gears 189 and 211 mesh with each other during copying of a sheet original, but during copying of a book or like original they are out of engagement with gear 189 displaced as will be described further.

The chain 195 further drives sprocket wheels 199 and 200 rotatably mounted on the shafts of electromagnetic clutches CL2 and CL3. Behind these clutches, sprocket wheels 201 and 202 having different numbers of teeth are securely mounted on the respective clutch shafts, and connected together by a chain 203. A drum 204 is mounted on the shaft of the clutch CL2 and a length of wire 205 is wound in several turns on the drum 204 and extends therefrom in a cross fashion to pass over guide pulley 206, with the opposite ends of the wire secured to the forward and rearward ends of the carriage 103. By the selective use of the two clutches CL2 and CL3, the drum 204 can be rotated in either direction to thereby cause forward or backward movement of the carriage 103. The gear ratio of the gears 201 and 202 is selected such that the backward movement of the carriage can be faster than the forward movement.

When the copying operation is initiated with the developing liquid and other necessary parts ready for such operation, the photosensitive drum 117 begins rotating, while the carriage 103 is normally stationary at its sheet-original copy position, so that the gear 189 is in meshing engagement with gear 211 to rotate rollers $121_1$, $121_2$, $118_1$ and $118_2$. When a sheet original is inserted from the right-hand side into the nip between rollers $118_1$ and $118_2$, it is transported leftwardly so that the leading edge thereof is detected by the lamp 119 and light receiving element 120, whereupon rollers $181_1$ and $181_2$ are stopped from rotating, thus bringing the sheet original to a temporary standstill.

When the photosensitive drum 117 reaches a predetermined position, the cam 257 of drum gear 177 actuates microswitches MS1 and MS4 (operable for A4 or smaller format) one after another to produce an original start signal, whereupon rollers $181_1$ and $181_2$ resume their rotations to transport the original leftwardly in synchronism with the photosensitive drum, so that the original is discharged upwardly of the machine body by rollers $121_1$ and $121_2$.

Figure 17:
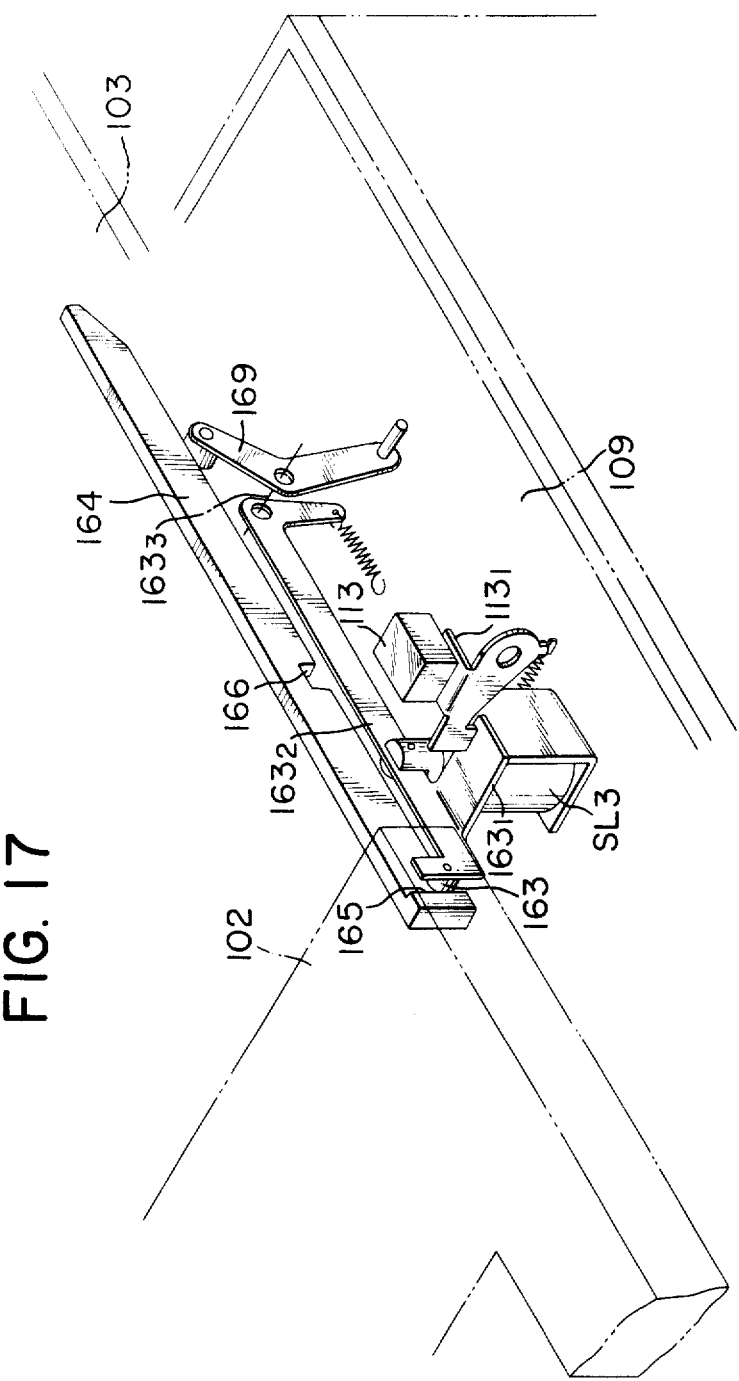
FIG. 17 shows, in perspective view, the movable lock mechanism for the original carriage.
Figure 18:
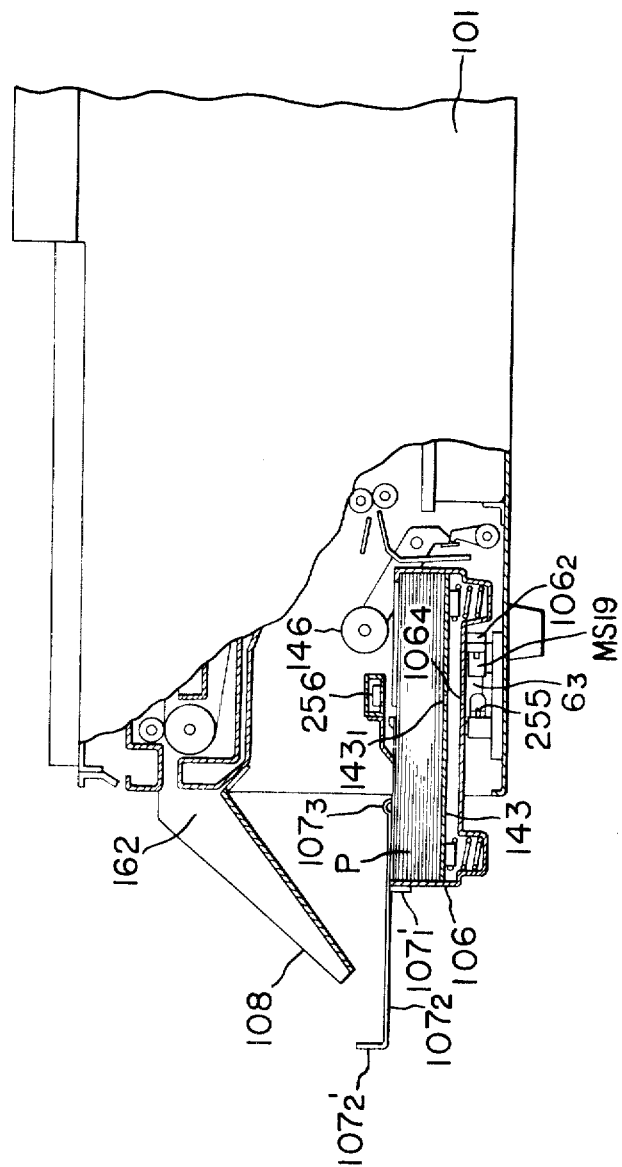
FIG. 18 illustrates the manner in which a transfer paper cassette has been loaded.
Figure 16:
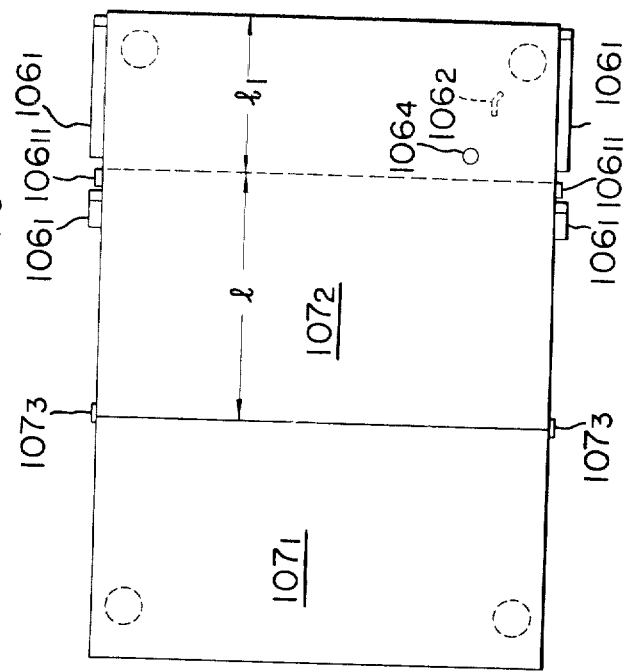
FIG. 16 is a fragmentary plan view of the carriage.
Figure 20:
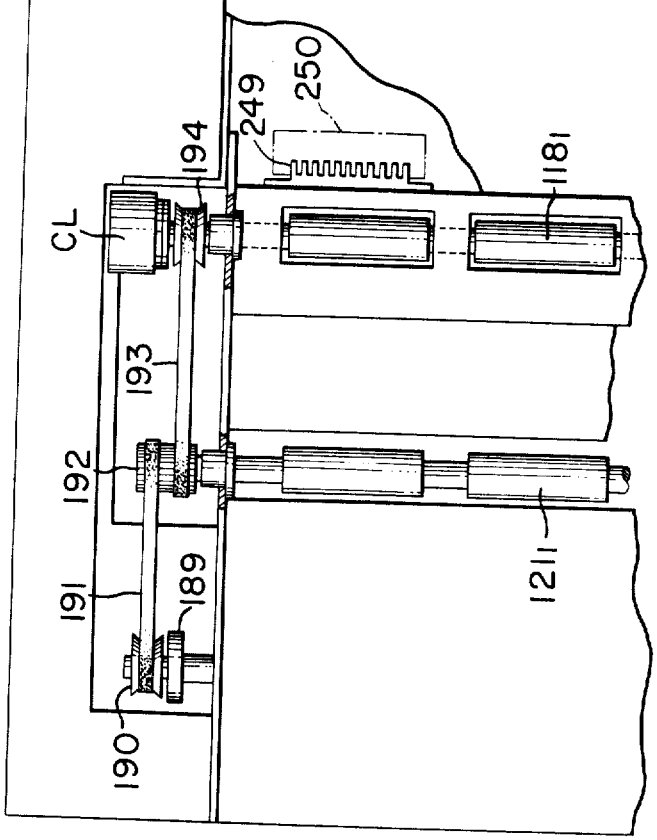
FIG. 20 is a plan view of a format A3 cassette.

Change-over to the book copy mode may be accomplished by the use of a mechanism as shown in FIG. 17, that is, a change-over button 113 is depressed to actuate a lever $131_1$ and a projection $163_1$ to pivot a lever $163_2$ counter-clockwise about a pivot pin $163_3$ and release a roller 163 downwardly, whereby a cam 164 in the lower portion of the original carriage 103 is disengaged from a sheet original positioning groove 165. When the carriage 103 is pushed leftwardly, the roller 163 is forced into a book positioning groove 166 by the force of spring $163_4$ so as to permit the sheet original transport portion 102 to move with the carriage 103 to thereby break the engagement between gears 189 and 211. Thereupon, the leading end $167_1$ of the glass plate 167 on the carriage 103 is aligned with the position as assumed by photoelectric means 119, 120 during sheet original copy mode.

Then, a book to be copied is placed on the carriage glass plate 167 with the leading end thereof registered with the leading end $167_1$ of the glass plate and a keep cover 104 is overlaid to hold the book. Copy button 114' is then depressed to cause electromagnetic plunger SL3 to be energized by an original start signal from photosensitive drum 117 and drum 177 as in the sheet original copy mode, thereby disengaging the roller 163 from the groove 166 while moving the carriage forwardly in synchronism with the photosensitive drum 117 to effect through-the-slit exposure.

Upon completion of the exposure, the carriage is stopped by a signal from itself in accordance with the size of the original and immediately reverts to its quick return stroke until it is stopped at its start position by the engagement between roller 163 and groove 166. To effect continuous copying of the same original, counter means 114 (not shown in detail) operatively connected to copy button 114' is provided so that crank 169 is rotated by cam 164 for each reciprocation of the carriage is actuate the ratchet mechanism of the counter means to reciprocate the carriage 103 as frequently as is required to obtain a predetermined number of copies, whereafter copy button 114' is released to stop the carriage 103.

The photosensitive drum 117 in the present embodiment is useful to copy originals of up to format A3, and has an outer peripheral length somewhat greater than the length of format A3. Therefore, sheet originals of format A3 may be fed and copied at a rate of one sheet per full rotation of the photosensitive drum, and sheet originals of format A4 may be fed and copied with their longitudinal axes oriented transversely of the carriage and at a rate of two sheets per full rotation of the photosensitive drum. In case of books or like originals, a forward stroke (exposure stroke) of the original carriage must be followed by a backward stroke which takes substantially the same length of time as the forward stroke, and this means that substantially twice the time required to copy a sheet original is required to obtain a copy of a book. It will thus be seen that books of format A3 can be copied at the rate of one copy per two full rotations of the photosensitive drum and books of format A4 at the rate of one copy per full rotation of the photosensitive drum.

Such cycle differential resulting from the difference in size of originals is detected by a signal from a cassette 106, and a cycle differential resulting from the difference in type of originals is detected by a signal produced with a change in the position of the carriage.

In the shown embodiment, formats A3 and A4 are taken as examples. As illustrated in FIGS. 18 to 22, a cassette for A4 or smaller format (FIG. 19) or a cassette for A3 is provided with loading signal pawls 106$_2$ which produce a loading completion signal through a microswitch MS19 in the main body of the copying machine. The cassette for A4 or smaller format (FIG. 19) is provided with a cam 106$_3$ which actuates a microswitch MS13 or MS16 for the size change. Numerals 255 and 256 designate photoelectric means for detecting the presence of transfer paper through holes 106$_4$ and 143$_1$ formed in the bottom and intermediate plates of the cassette, respectively.

Figure 15:
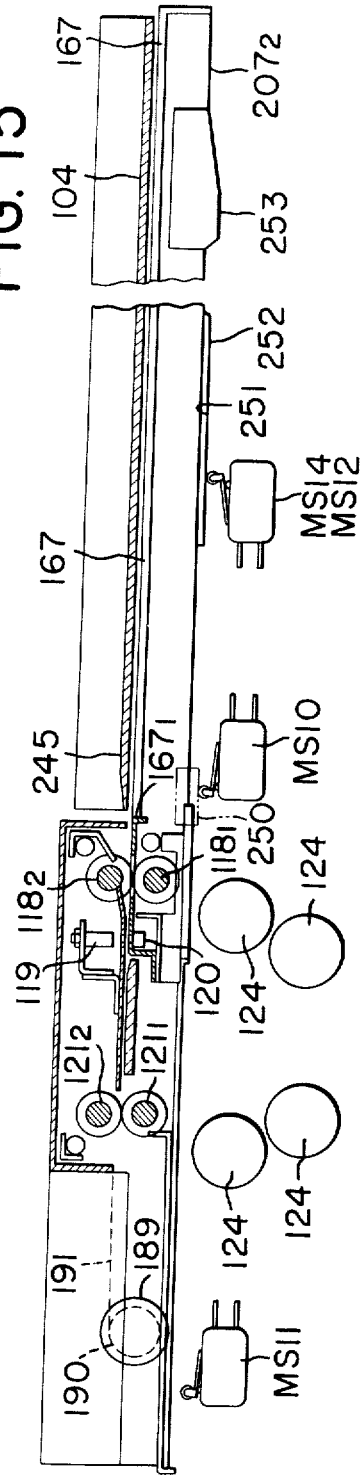
FIG. 15 is a vertical section of the original carriage.
Figure 19:
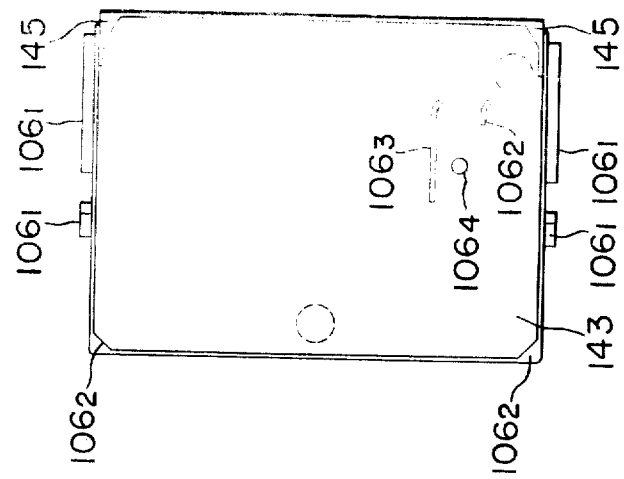
FIG. 19 is a plan view of a format A4 cassette.

As shown in FIG. 15, cams 251–253 are provided on the underside of the carriage 103, the cam 251 being adapted to actuate a microswitch MS14 to detect the position of the carriage relative to the original thereon. More specifically, when the carriage is in the shown position for sheet original, the cam 251 opens a change-over switch MS14-a in the book control circuit shown in the diagram of FIG. 22. The cam 252 is adapted to actuate a microswitch MS12 to stop the carriage 103 at a predetermined position during its forward movement in the book copy mode. The cam 253 is designed to actuate a microswitch MS10 when the original is of A4 or smaller format, and to actuate a microswitch MS11 when the original is of format A3, thereby producing a carriage reversing signal.

Figure 22:
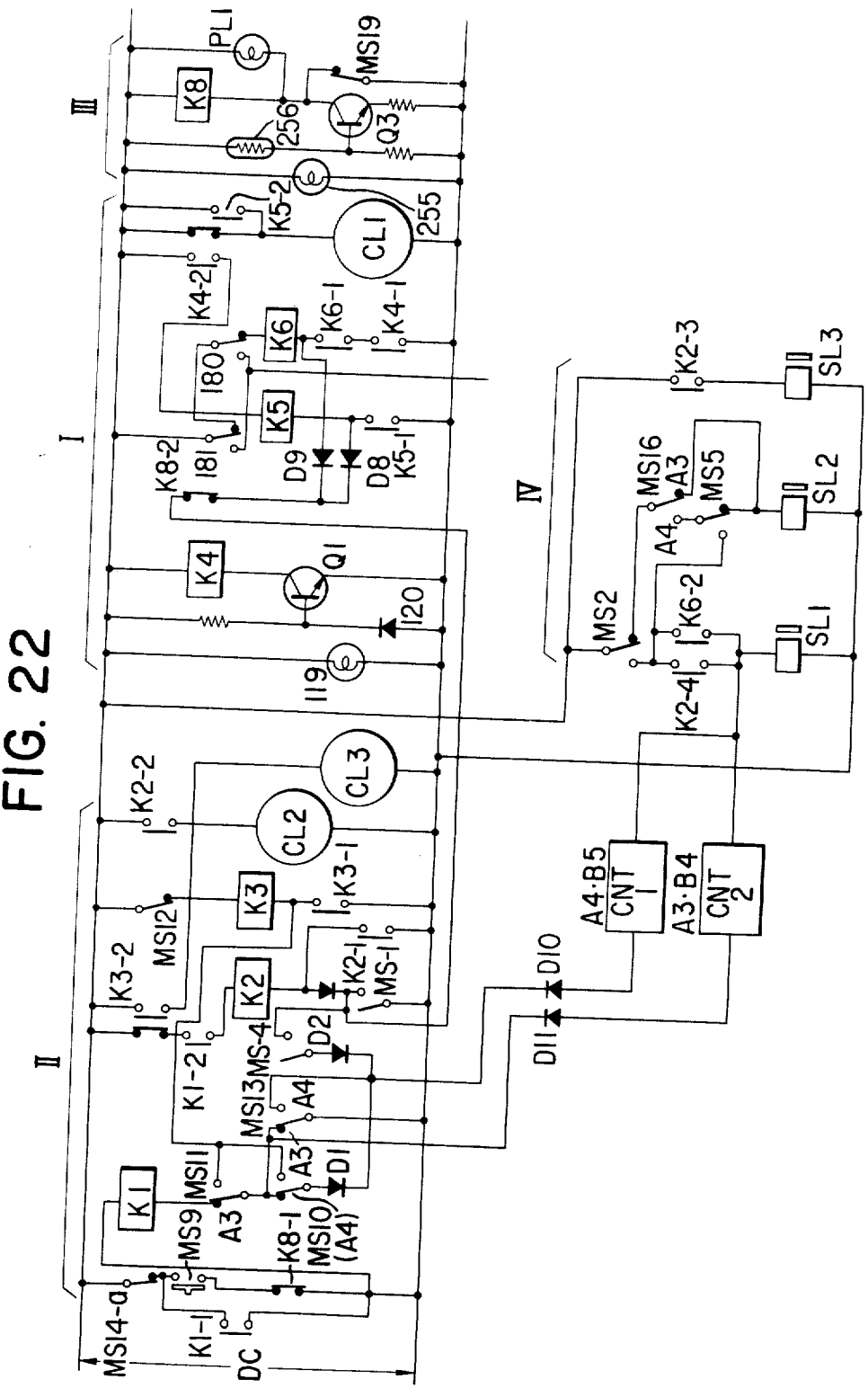
FIG. 22 diagrammatically shows the electric circuit in the copying apparatus.

The electrical control circuit for controlling various parts in the described manner will now be described with reference to FIG. 22.

I Copying of Sheet Originals

When no originals is present in the sheet original transport portion 102 on the carriage 103, the light receiving element 120 forming a part of original detecting photoelectric means 119, 120 produces an electromotive force which turns off transistor Q1 and accordingly deenergizes an original detector relay K4, whose normally closed contact K4-2 thus energized electromagnetic clutch CL1 so that original transport roller 118$_1$ is being driven by gear 189.

When a sheet original is transported through rollers 118$_1$ and 118$_2$ and the leading edge thereof reaches detection points 119, 120, this turns on transistor Q1 and relay K4, whose contact K4-2NC is thus opened to deenergize clutch CL1, thereby stopping the original temporarily.

Figure 13:
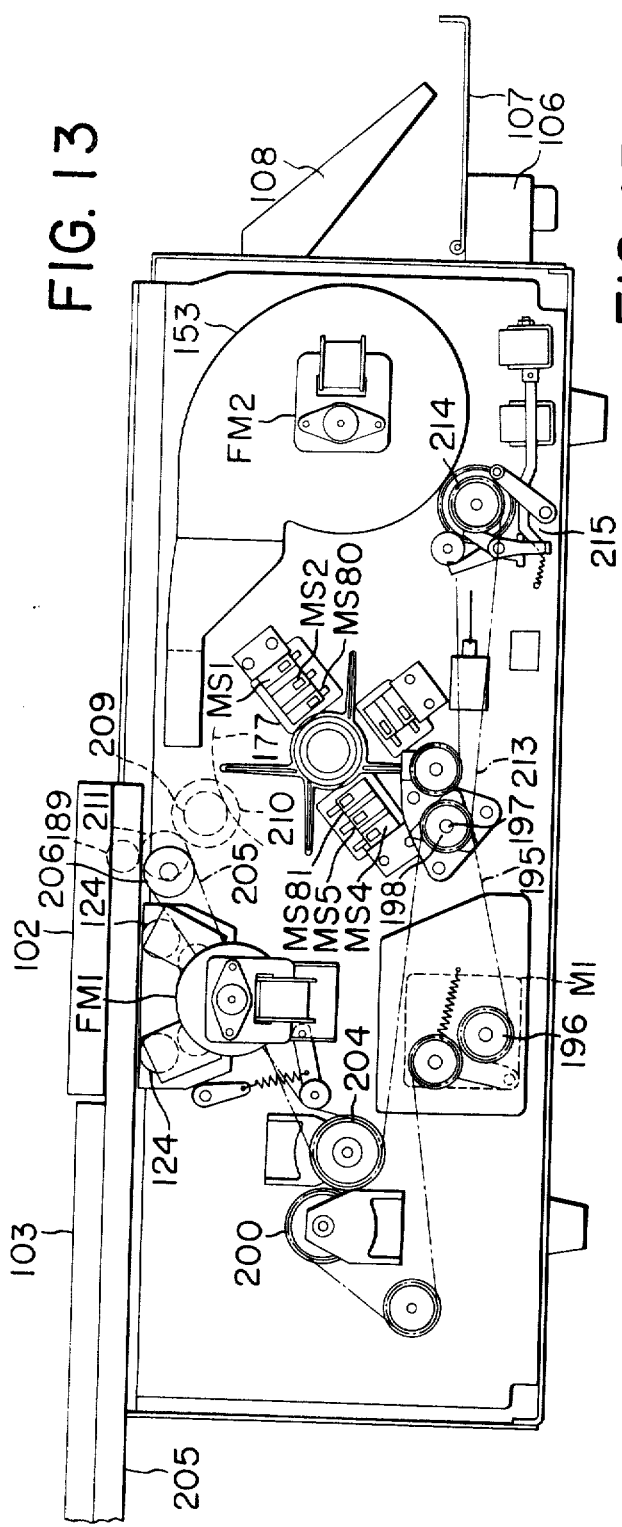
FIG. 13 is a schematic rear view of the FIG. 12 apparatus showing a transmission and other mechanisms.

When the cam 257 of the rotating drum gear 177 closes the original start microswitch MS1 (FIG. 13), relay K5 is energized to complete a circuit of (K4-2)-K5 - D8 - (K8-2) - MS1 and self-holds by its contact K5-1 and clutch CL is energized through relay contact K5-2 to start transport of the original.

At this stage, transistor Q3 is in the OFF position because of the light being cut off between photoelectric means 255 and 256 due to the cassette loading, with cassette loading signal switch MS19 and paper absence indicator lamp PL1 both being turned on, and accordingly the normally closed contact K5-2 is opened.

If the transfer paper P in the cassette 106 is of format A3, switch MS13 is closed at its contact A3 while switch MS16 is open. Thus, the drum 117 is further rotated to actuate a subsequent original start microswitch MS4, whereupon relay K5 is energized to re-energize clutch CL1 through a circuit of (K4-2) - K5 - D8 - (K8-2) - MS4 - D2 - (MS13-A4) (this does not take place in response to format A3 but to A4 or smaller format). Thus, a second sheet original of format A4 starts to be transported during one full rotation of the drum 117.

On the other hand, relay K6 is energized through a circuit of (K8-2) - D7 - K6 - (MS80.81) normally closed, and self-holds by the relay contacts K6-1 and K4-1. Rotation of the photosensitive drum 117 causes cam 257 to actuate paper feed microswitches MS2 and MS3. When the original is of A3 format, switch MS2 changes over from normally energized solenoid SL2 to a circuit of (K6-2)- SL1 once a full rotation of the photosensitive drum 117 to control the paper feed rollers 146, 147, for feeding transfer paper. When the original is of A4 or smaller format, solenoids SL1 and SL2 are changed over even at opening-closing of the circuit (MS16-A4)- MS5, thus permitting two sheets of transfer paper to be fed per full rotation of the photosensitive drum.

The paper feed solenoid SL1 having so operated means that copying has been accomplished and therefore, during such time counter CNT1 for format A4 (or B5) and counter CNT2 for format A3 (or B4) parallel-connected with the solenoid SL1 are respectively connected to the contacts A4 and A3 of switch MS13 through diodes D10 and D11. As a result, each counter accurately indicates the number of used copy sheets for each format.

In the shown circuit, it should be noted that microswitches MS80 and MS81, which are adapted to be actuated by the cam 259 of the drum gear 177 so as to hold the relay K6 in its energized position by its normally closed contact, may also serve to produce a signal of jam detection, not shown.

When the original has a length substantially equal to the distance between the sheet original transport rollers 118 and 121, there is a problem which is described hereinafter. As seen in the time chart of FIG. 23, the time interval at which relays K4 and K5 are operative is shorter than the time interval at which switch MS2 is operative, and therefore, where K4 is used (instead of K6), solenoid SL1 fails to function to accomplish paper feeding although the sheet original can properly pass through the rollers 118 and 121. To avoid this, relay K6 is used which is operable for a predetermined time independently of the length of the original with the aid of switches MS80 and 81 on the drum adapted to operate later than switch MS2.

II Copying of Books

When the original carriage 103 is displaced as previously described until the forward end $167_1$ thereof is aligned with the detecting position (the position at which photoelectric means 119, 120 are located during sheet original copying mode), connectors 249 and 250 are disconnected and position detector cam 251 on the underside of the carriage actuates microswitch MS14 to close its book copy contact MS14-a.

Depression of copy start button 114' closes switch MS9 to complete a circuit of (MS14-a)- MS9 - (K8-1) - K1 - (MS11-A3) -(MS13-A3), so that relay K1 is energized and self-holds by its contact K1-1.

The cam 257 on drum gear 177 closes original start switch MS1 to complete a circuit of normally closed contact (K3-2NC) - (K1-2) - K2 - MS1, so that relay K2 for the forward movement of the carriage is energized and self-holds by its contact K2-1. Relay contact K2-3 is closed to energize solenoid SL3, which disengages roller 163 from groove 166 to thereby unlock the carriage 103.

Relay contact K2-2 is closed to energize clutch CL2 thereby moving the carriage 103 forwardly, and then cam 253 actuates switch MS10 (for reversing the carriage when format A4 is used) or switch MS11 (for reversing the carriage when format A3 is used), these switches being located in the path of the carriage. As a result, relay K1 and thus, relay K2 is deenergized thereby deenergizing clutch CL2 to stop the carriage 103.

The reversing contact of microswitch MS10 or MS11 energizes relay K3 for the backward movement of the carriage to complete a circuit of (MS12 - K3 - (MS10-A3) - D1 - (MS13-A4) or a circuit of MS12 - K3 - (MS11-A4) - (MS13-A3) - K3-1, and the relay K3 self-holds by its contact K3-1. The contact K3-2 of the relay K3 energizes electromagnetic clutch CL3 for the backward movement of the carriage to thereby move the carriage in the opposite or backward direction. When the carriage returns to a predetermined position (i.e. when the forward end $167_1$ of carriage comes to the detecting position), cam 252 actuates to open microswitch MS12, thus deenergizing relay K4 and clutch CL3 to stop the carriage 103.

The above-described operation may be repeated by depressing the start button 114' again, or may be automatically repeated in response to counter means 114.

For simplicity, the detecting position for the sheet original and the detecting position for the book carriage have been described to be identical, whereas it is actually desirable that the stop position of the carriage be slightly spaced apart from the stop position for a sheet original (i.e. from the illuminating station 122) because there is a difference in inertia between the two cases and a difference in the distance required to attain a stability of movement when the same signal is used to start the carriage in the two cases. Moreover, the said spacing must be within such a range that will not affect the start signal from the drum and the sequence of operations of other microswitches, and the paper feed microswitches MS2 and MS5 must be used exclusively during sheet copy mode, while additional two microswitches must be provided for use during book copy mode or a paper feed signal must be derived from the movement of the carriage during the latter mode.

As will be appreciated, the present invention provides a copy counter for formats A4 and B5 and a copy counter for formats A3 and B4 and it is thus possible to rationally determine the charge by determining the consumption factors of expendables for format A4 or B5, the wear and tear factor of the machine, and similar factors for format A3 or B4, and by multiplying the numerical display of copy counter CNT1 or CNT2 by those factors.

This is particularly effective for use with the socalled total guarantee system which charges an amount per copy including the costs of expendables and maintenance cost of the machine, because this can rationally determine the real losses and the charge in a proportionate manner.

Further, in the above-described embodiment, there are provided two copy counters, one for format A3 or B4 and one for format A4 or B5, because format A3 or B4 corresponds in length to the full circumference of the photosensitive drum and format A4 or B5 corresponds to half the circumference of the drum, whereas more than two copy counters may be employed in accordance with the type of copier (i.e. with the losses of the machine and the consumption of the expendables).

Also, the copy counters are free of malfunctioning since their change-over is accomplished automatically by the cassette and the copy cycle of the machine is changed over by the same signal.

We claim:

1. A copying apparatus for forming an image of an original on a copy medium, which comprises:
   a carriage adapted for reciprocating movement for supporting said original;
   copy processing means for forming an original image on the copy medium;
   means to grade a plurality of copy media bearing said original image thereon into a plurality of groups;
   a number of copy counter means equal to the number of said grade groups for counting the number of copy mediums in each of said grade groups; and
   means for actuating said copy counter means in response to the reciprocating movement of said carriage.

2. A copying apparatus according to claim 1, wherein said copy medium is in the form of a roll, and further comprising means for cutting the copy medium into individual copy medium sheets having a length corresponding to the length of the original, and said grading means including means for determining a plurality of size groups of copy medium sheets in accordance with the lengths of the sheets thus cut.

3. A copying apparatus according to claim 2, wherein said cutting means includes an index member movable in accordance with the length of said original, a cutting member for cutting said copy medium, and means connected with said movable index member to actuate said cutting member to cut said roll of copy medium to provide a copy medium sheet having the same length as said original, and further comprising a plurality of switch means equal in number to the number of said copy counter means, each of said copy counter means being connected with each of the respective switch means independently of each other, and cam means for actuating each of said switch means in accordance with a predetermined size of copy medium sheet, whereby each of said copy counter means records the number of copies made in each of said grade groups of predetermined sizes of copy medium sheets.

4. A copying apparatus according to claim 1 wherein said copy medium comprises pre-cut sheets and further comprising a plurality of copy medium cassettes each containing copy medium sheets of different predetermined sizes, the number of cassettes being equal to the number of grade groups and to the number of copy counter means, wherein the loading of each cassette into said apparatus actuates the copy counter means corresponding to said cassette to thereby count the number of sheets of copy medium removed from said cassette.

5. A copying apparatus according to claim 1, wherein the copy medium comprises a photosensitive material upon which a permanent image is formed.

6. A copying apparatus according to claim 5, wherein the copy medium is in the form of a roll.

7. A copying apparatus according to claim 1, wherein said copy processing means includes a photosensitive drum onto which said original image is projected to form a latent original image, means to develop said latent original image on said drum, and means to transfer said developed image onto said copy medium.

8. A copying apparatus according to claim 7, wherein said copy medium is in the form of a roll.

9. A copying apparatus according to claim 7, wherein said copy medium is in the form of pre-cut sheets of different predetermined sizes.

10. A copying apparatus comprising an original carriage for supporting an original, copy processing means for forming an image of said original on a copy medium, said copy medium being in the form of a roll, cutting means to cut said roll of copy medium in a sheet of random length corresponding to the length of the original, means to grade the cut sheets of copy medium into a plurality of groups and a number of copy counter means equal in number to the number of said grade groups for counting the number of copies made in each of said grade groups.

11. A copying apparatus according to claim 10, wherein the copy medium comprises a photosensitive material upon which a permanent image is formed.

12. A copying apparatus according to claim 10 wherein said copy processing means includes a photosensitive drum onto which said original image is projected to form a latent original image, means to develop said latent original image on said drum, and means to transfer said developed image onto said copy medium.

13. A copying apparatus according to claim 10, wherein said original carriage is linearly reciprocable between two positions, and wherein said cutting means includes an index member movable in accordance with the length of said original supported on said reciprocable original carriage, a cutting member for cutting said copy medium, and means connecting with said movable index member to actuate said cutting member to cut said roll of copy medium to provide a copy medium sheet having the same length as said original, and further comprising a plurality of switch means equal in number to the number of said copy counter means, each of said copy counter means being connected with each of the respective switch means independently of each other, and cam means for actuating each of said switch means in accordance with a predetermined size of copy medium sheet, whereby each of said copy counter means records the number of copies made in each of said grade groups of predetermined sizes of copy medium sheets.

* * * * *